US012712823B2

(12) United States Patent
Randriamasy et al.

(10) Patent No.: US 12,712,823 B2
(45) Date of Patent: Aug. 18, 2026

(54) RESOURCE ALLOCATION FOR CONNECTED DEVICES

(71) Applicant: Nokia Solutions and Networks Oy, Espoo (FI)

(72) Inventors: Sabine Randriamasy, Massy (FR); Mata Khalili, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 77 days.

(21) Appl. No.: 18/756,215

(22) Filed: Jun. 27, 2024

(65) Prior Publication Data

US 2025/0030646 A1 Jan. 23, 2025

(30) Foreign Application Priority Data

Jul. 12, 2023 (FI) ..................................... 20235816

(51) Int. Cl.
*H04L 47/62* (2022.01)
*H04L 47/74* (2022.01)
(Continued)

(52) U.S. Cl.
CPC .......... *H04L 47/762* (2013.01); *H04L 47/745* (2013.01); *H04L 47/805* (2013.01)

(58) Field of Classification Search
None
See application file for complete search history.

(56) References Cited

U.S. PATENT DOCUMENTS 11,310,733 B1 4/2022 Gupta et al.
2017/0083368 A1 * 3/2017 Bishop .................. G06F 3/0631
(Continued)

FOREIGN PATENT DOCUMENTS

EP 3470983 A1 4/2019
WO WO-2013084268 A1 * 6/2013 ........... G06Q 10/067
(Continued)

OTHER PUBLICATIONS

English machine translation of WO2013084268 (Year: 2013).*
(Continued)

*Primary Examiner* — June Sison
(74) *Attorney, Agent, or Firm* — DITTHAVONG, STEINER & MLOTKOWSKI

(57) ABSTRACT

According to an example aspect of the present disclosure, there is provided a method comprising receiving by a control apparatus, from a client apparatus, a request for a resource allocation of one or more connected devices on one or more time ranges, receiving by the control apparatus, from an orchestrator apparatus, a work plan for a group of connected devices, wherein the work plan comprises planned positions of the group of connected devices and the group of connected devices comprises said one or more connected devices, computing by the control apparatus, based at least on the work plan, a resource allocation for each of multiple connection points on said one or more time ranges, wherein the resource allocation comprises an assignation of said one or more connected devices to the connected points and transmitting, by the control apparatus, the resource allocation to the client apparatus.

18 Claims, 4 Drawing Sheets

(51) Int. Cl.
*H04L 47/762* (2022.01)
*H04L 47/80* (2022.01)

(56) References Cited

U.S. PATENT DOCUMENTS

| | | | |
|---|---|---|---|
| 2017/0325120 A1 | 11/2017 | Szilagyi et al. | |
| 2019/0158606 A1 | 5/2019 | Guim Bernat et al. | |
| 2020/0107237 A1* | 4/2020 | Mangalvedhe | G08G 5/26 |
| 2020/0351167 A1 | 11/2020 | Sharma et al. | |
| 2021/0185603 A1 | 6/2021 | Bogineni et al. | |
| 2021/0218661 A1 | 7/2021 | Wang et al. | |
| 2022/0086846 A1 | 3/2022 | Sharma | |
| 2022/0124560 A1 | 4/2022 | Yeh et al. | |
| 2022/0137640 A1 | 5/2022 | Geitz et al. | |
| 2022/0276892 A1 | 9/2022 | Randriamasy et al. | |
| 2023/0120629 A1* | 4/2023 | Cui | H04L 41/5067 709/226 |

FOREIGN PATENT DOCUMENTS

| | | |
|---|---|---|
| WO | 2019/231923 A1 | 12/2019 |
| WO | 2022/045879 A1 | 3/2022 |
| WO | 2022/167093 A1 | 8/2022 |

OTHER PUBLICATIONS

Extended European Search Report received for corresponding European Patent Application No. 24184715.1, dated Jan. 3, 2025, 10 pages.
Roome et al., "An Extension for Application-Layer Traffic Optimization (ALTO): Entity Property Maps", RFC 9240, Internet Engineering Task Force (IETF), Jul. 2022, pp. 1-53.
"Interface for the communication between automated guided vehicles (AGV) and a master control", VDA Recommendation, VDA 5050, Version 2.0.0, Jan. 2022, pp. 1-60.
Alimi et al., "Application-Layer Traffic Optimization (ALTO) Protocol", RFC 7285, Internet Engineering Task Force (IETF), Sep. 2014, pp. 1-91.
Randriamasy et al., "Application-Layer Traffic Optimization (ALTO) Cost Calendar", RFC 8896, Internet Engineering Task Force (IETF), Nov. 2020, pp. 1-35.
Roome et al., "Application-Layer Traffic Optimization (ALTO) Incremental Updates Using Server-Sent Events (SSE)", RFC 8895, Internet Engineering Task Force (IETF), Nov. 2020, pp. 1-52.
Mu et al., "Intelligent Reflecting Surface Enhanced Indoor Robot Path Planning Using Radio Maps", arXiv, Sep. 24, 2020, 7 pages.
Ghaffarkhah et al., "Communication-Aware Motion Planning in Mobile Networks", IEEE Transactions on Automatic Control, vol. 56, No. 10, Oct. 2011, pp. 1-6.
Muralidharan et al., "Communication-Aware Robotics: Exploiting Motion for Communication", Annual Review of Control, Robotics, and Autonomous Systems, vol. 04, 2021, pp. 1-27.
Stephan et al., "Hybrid Decentralized Control System for Communication Aware Mobile Robotic Teams", The University of Pennsylvania , 2014, 8 pages.
Fink et al., "Robust Control of Mobility and Communications in Autonomous Robot Teams", IEEE Access, vol. 01, May 10, 2013, pp. 290-309.
"Vehicle Finder", Antdriven, Retrieved on Jul. 1, 2024, Webpage available at : https://www.antdriven.com/vehicle-finder?vehicles%5BsortBy%5D=vehicles.
"VDA 5050 Explained—An Overview of the Evolving Agv Communication Standard", Bluebotics, Retrieved on Jul. 1, 2024, Webpage available at : https://bluebotics.com/vda-5050-explained-agv-communication-standard/.
Toy, "Intent-based Networking for Connectivity and Cloud Services", Advances in Networks, vol. 09, No. 01, Mar. 10, 2021, pp. 19-22.
Fielding et al., "Hypertext Transfer Protocol (HTTP/1.1): Semantics and Content", RFC 7231, Internet Engineering Task Force (IETF), Jun. 2014, pp. 1-101.
Office action received for corresponding Finnish Patent Application No. 20235816, dated Dec. 1, 2023, 13 pages.

* cited by examiner

RESOURCE ALLOCATION FOR CONNECTED DEVICES

FIELD

Various example embodiments relate in general to connected devices and more specifically, to assigning connected devices to connection points.

BACKGROUND

Resource allocation is important in various communication networks, such as in networks where mobile and static Connected Devices, CODs, move in a workspace. The CODs may be controlled by functions located in the cloud and receive work plans and instructions via a connection point. In general, there is a need to provide improved methods, apparatuses and computer programs for enhancing resource allocation for CODs.

SUMMARY

According to some aspects, there is provided the subject-matter of the independent claims. Some example embodiments are defined in the dependent claims.

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

According to a first aspect of the present disclosure, there is provided an apparatus comprising at least one processor, and at least one memory storing instructions that, when executed by the at least one processor, cause the apparatus at least to receive, from a client apparatus, a request for a resource allocation of one or more connected devices on one or more a time ranges, receive, from an orchestrator apparatus, a work plan for a group of connected devices, wherein the work plan comprises planned positions of the group of connected devices and the group of connected devices comprises said one or more connected devices, compute, based at least on the work plan, a resource allocation for each of multiple connection points on said one or more time ranges, wherein the resource allocation comprises an assignation of said one or more connected devices to the connection points and transmit the resource allocation to the client apparatus. The apparatus may be a control apparatus.

Example embodiments of the first aspect may comprise at least one feature from the following bulleted list or any combination of the following features:

- wherein the stored instructions further cause, when executed by the at least one processor, the apparatus at least to receive, from the client apparatus, a requested quality of experience of a flow for said one or more connected devices for said time range and compute, based at least on the requested quality of experience of the flow, the resource allocation;
- wherein the stored instructions further cause, when executed by the at least one processor, the apparatus at least to compute a connection point capability calendar on said time range and compute, based at least on the connection point capability calendar, the resource allocation;
- wherein the stored instructions further cause, when executed by the at least one processor, the apparatus at least to determine a previous connection point capability calendar, wherein the previous connection point capability calendar was used before receiving the request and compute, based at least on the previous connection point capability calendar, the resource allocation;
- wherein the stored instructions further cause, when executed by the at least one processor, the apparatus at least to monitor resource consumption of the connection points to detect a shortage of resources and adjust the resource allocation for at least one of said multiple connection points when the shortage of resources is detected at a frequency larger than a threshold and adjust the connection point capability calendar for at least one of said multiple connection points when the shortage of resources is detected at a frequency lower than a threshold on said connection points;
- wherein the resource allocation comprises at least one network slice.

According to a second aspect, there is provided a method comprising receiving by a control apparatus, from a client apparatus, a request for a resource allocation of one or more connected devices on one or more time ranges, receiving by the control apparatus, from an orchestrator apparatus, a work plan for a group of connected devices, wherein the work plan comprises planned positions of the group of connected devices and the group of connected devices comprises said one or more connected devices, computing by the control apparatus, based at least on the work plan, a resource allocation for each of multiple connection points on said one or more time ranges, wherein the resource allocation comprises an assignation of said one or more connected devices to the connection points and transmitting, by the control apparatus, the resource allocation to the client apparatus.

Example embodiments of the second aspect may comprise at least one feature from the following bulleted list or any combination of the following features:

- receiving by the control apparatus, from the client apparatus, a requested quality of experience attributes of a flow for said one or more connected devices for said time range and computing by the control apparatus, based at least on the requested quality of experience attributes of the flow, the resource allocation;
- computing, by the control apparatus, a connection point capability calendar on said time range and computing by the control apparatus, based at least on the connection point capability calendar, the resource allocation;
- determining, by the control apparatus, a previous connection point capability calendar, wherein the previous connection point capability calendar was used before receiving the request and computing by the control apparatus, based at least on the previous connection point capability calendar, the resource allocation;
- monitoring, by the control apparatus, resource consumption of the connection points to detect a shortage of resources and adjusting, by the control apparatus, the resource allocation for at least one of said multiple connection points when the shortage of resources is detected at a frequency larger than a threshold and adjust the connection point capability calendar for at least one of said multiple connection points when the shortage of resources is detected at a frequency lower than a threshold on said connection points;
- wherein the resource allocation comprises at least one network slice.

According to a third aspect of the present disclosure, there is provided an apparatus comprising means for receiving, from a client apparatus, a request for a resource allocation of one or more connected devices on one or more time ranges, means for receiving, from an orchestrator apparatus, a work plan for a group of connected devices, wherein the work plan comprises planned positions of the group of connected devices and the group of connected devices comprises said one or more connected devices, means for computing, based at least on the work plan, a resource allocation for each of multiple connection points on said one or more time ranges, wherein the resource allocation comprises an assignation of said one or more connected devices to the connection points and means for transmitting the resource allocation to the client apparatus. The apparatus may further comprise means for performing the method and the example embodiments of the method. The apparatus may be a control apparatus.

According to a fourth aspect of the present disclosure, there is provided non-transitory computer readable medium having stored thereon a set of computer readable instructions that, when executed by at least one processor, cause an apparatus to at least perform the method. According to a fifth aspect of the present disclosure, there is provided a computer program comprising instructions which, when the program is executed by an apparatus, cause the apparatus to carry out the method.

EMBODIMENTS

Embodiments of the present disclosure provide enhancements for resource allocation for Connected Devices, CODs. More specifically, embodiments of the present disclosure enable communicating in a timely and reliable manner, such that an availability of an adequate Connection Point, CP, may be ensured in the vicinity of a COD. Resource allocation for the COD may be requested for a certain time range from a control apparatus and the control apparatus may also receive planned positions of a group of CODs on said time range. The client apparatus may then take into account at least the work plan when computing the resource allocation, thereby further enhancing resource allocation for the COD. The time range may be for example a certain point in time, possibly with a margin around this point in time. In some example embodiments, the margin may be 0 though. The time range may refer to a given point in time or to a time period. The time range may be, e.g., 1 hour or span across multiple calendar dates.

Figure 1:
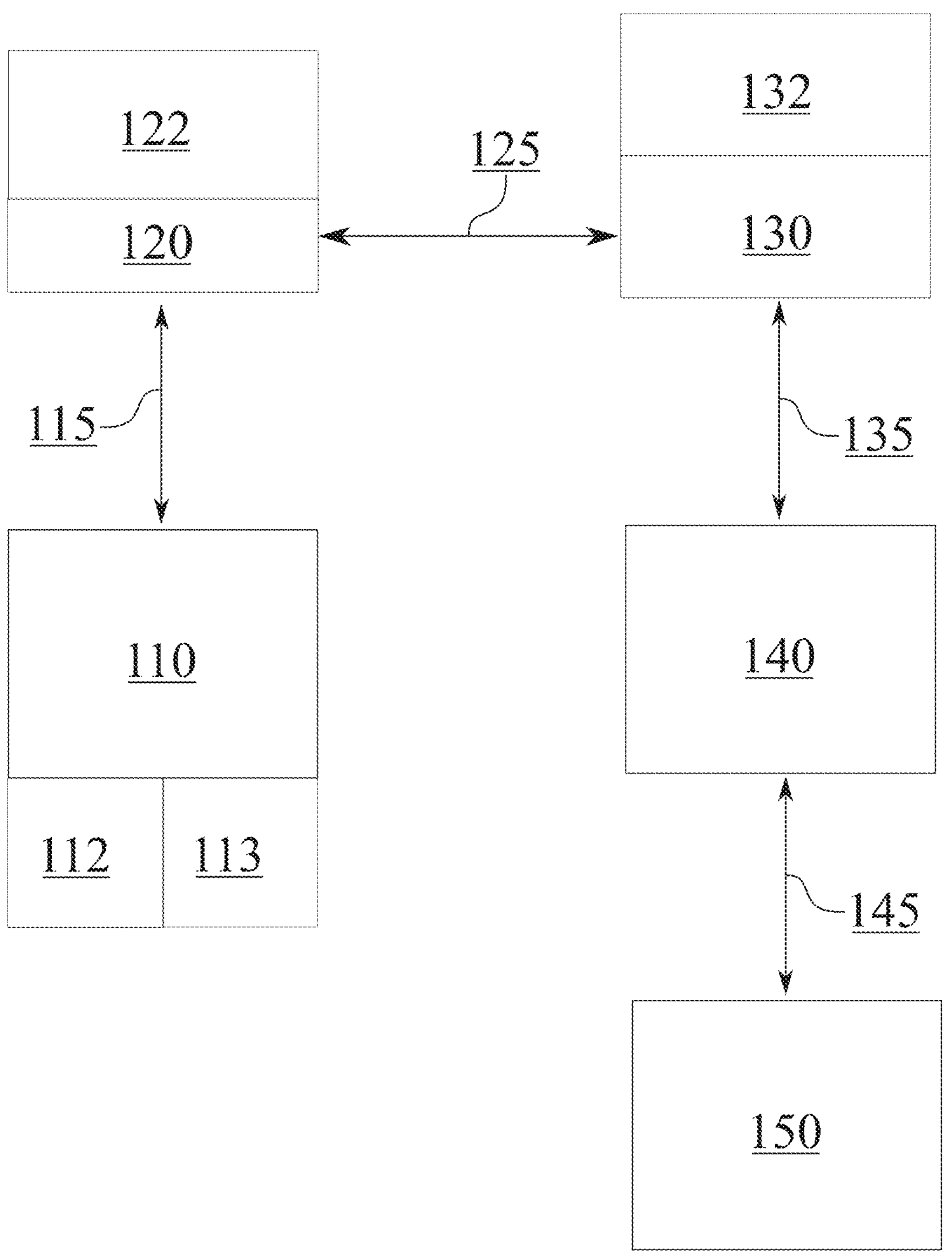
FIG. 1 illustrates a network scenario in accordance with at least some example embodiments.

FIG. 1 illustrates an example network scenario in accordance with at least some embodiments. The example network scenario of FIG. 1 comprises control apparatus 110, MLEARNED apparatus 113, CP capability calendar apparatus 112, client apparatus 120, orchestrator apparatus 122, edge apparatus 130, Edge COD COontroller, ECOCO, apparatus 132, CP 140 and COD 150. In some example embodiments, control apparatus 110 may be configured to operate as Intent-Based Application Slicing, IBAS, Motion Aware Coordinated connection, MACO. MLEARNED apparatus 113 may be configured to compute an estimation of a duration of a COD work plan task duration. CP capability calendar apparatus 112 may be configured to compute time-based CP capability. In addition, client apparatus 120 may configured to operate to as IBAS-MACO client and orchestrator apparatus 122 may be configured to operate as COD orchestrator. Edge apparatus 130 may be configured to operate as Edge MACO, EMACO.

Control apparatus 110 may communicate with client apparatus 120 via interface 115. Interface 115 may be a wired interface. Client apparatus 120 may also communicate with edge apparatus 130 via interface 125. Interface 125 may also be a wired interface. Orchestrator apparatus 122 may communicate with control apparatus 110 via client apparatus 120. Edge apparatus 130 may communicate with connection point 140 via interface 135. Interface 135 may be a wired interface.

Connection point 140 may communicate with connected device 150 via interface 145. Interface 145 may be a wired interface. Air interface 145 between connection point 140 and connected device 150 may be configured in accordance with a Radio Access Technology, RAT, which connection point 140 and COD 150 are configured to support.

Examples of cellular RATs comprise Long Term Evolution, LTE, New Radio, NR, which may also be known as fifth generation, 5G, radio access technology, 6G and MulteFire. On the other hand, examples of non-cellular RATs include Wireless Local Area Network, WLAN, and Worldwide Interoperability for Microwave Access, WiMAX.

In case of cellular RATs, connection point 140 may be wireless network node, such as a Base Station, BS. For example, in the context of LTE, the wireless network node may be referred to as eNB while in the context of NR, the wireless network node may be referred to as gNB. In some embodiments, the wireless network node may be referred to as a Transmission and Reception Point, TRP, or control multiple TRPs that may be co-located or non-co-located. Also, for example in the context of WLAN, the wireless network node may be referred to as an access point. In any case, embodiments of the present invention are not restricted to any particular wireless technology.

Control apparatus 110 may be configured to assign CODs, such as COD 150, to CPs, comprising CP 140. Client apparatus 120 may be configured to request a resource allocation from control apparatus 110. Edge apparatus 130 may be configured to convey the resource allocation to COD 150 via CP 140. COD 150 may comprise, for example, an Internet of Things, IoT, node. In some embodiments, connected device may comprise or be associated with an industrial IoT node, such as a mobile or fixed robot, surveillance camera, etc.

For example in the context of Industry 4.0, CODs may be mobile and static devices moving in a workspace and controlled by functions located in the cloud. Orchestrator apparatus 122 and ECOCO apparatus 132 may be configured to perform as COD Control Functions, CCFs, and send work plans and instructions to the CODs. The CCFs may receive information from COD 150, wherein said information reflects the sensed environment of COD 150 and execution state on the assigned task. The CCFs may respond with information inferred from the sensed environment, such as, a position or additional instructions to execute upon a specific state, such as an emergency. Each COD may communicate with one or more CCF via one or more CPs, such as WIFI, LTE or 5G access points.

In some example embodiments, the workspace may be a factory floor or a campus where one or more CODs, e.g., static or mobile robots, may be controlled from the cloud to execute a series of tasks. A set of CODs may perform various tasks and data collection. The control plane of the CODs may be fully or partially offloaded to orchestrator apparatus 122 or edge apparatus 130.

A set of ECOCO apparatus 132 may be located in the edge cloud. ECOCO apparatus 132 may be a control unit configured to send low-level control commands to COD 150, so that COD 150 may perform the task securely. For example, ECOCO 132 may transmit the low-level control commands to edge apparatus 130, to be further forwarded to COD 150 by edge apparatus 130. The low-level control commands may be specific to a robot application and in such a case, further related to controlling motion of a mobile COD, such linear and angular velocity. There may be one single centralized control unit for all CODs or one specialized control unit per COD. ECOCO apparatus 132 may receive for example data flows of sensors installed on the CODs. The received data may be processed to estimate the COD's internal and external status such as a position or battery state. ECOCO apparatus 132 may also receive orders, such as task execution "pause" and "resume", from orchestrator apparatus 122.

Orchestrator apparatus 122 may be located in the central or edge cloud and be in charge of task allocation, including the list of path waypoints for CODs and supervision of task execution. Orchestrator apparatus 122 may receive the position of each COD, the execution state of the task and internal state information from the CODs or their controllers. Orchestrator apparatus 122 may also receive the location of all objects in the operational space, by processing the data received from environmental sensors, such as site cameras. The standard VDA 5050, for example as described in "Interface for the communication between automated guided vehicles (AGV) and a master control", Version 2.0.0, January 2022, may be an example of communication interface and message types between orchestrator apparatus 122 and other entities, like CODs. In such a case the CODs, may communicate with orchestrator apparatus 122 using the Message Queue Telemetry Transport, MQTT, protocol.

A CCF, such as orchestrator apparatus 122 or ECOCO apparatus 132, may need to communicate in a timely and reliable manner with CODs. The CCF may need to receive COD information in a timely manner in order to reliably define COD work plans and adjust such plans upon COD reporting. Communicating in a reliable and timely manner is particularly important when the CODs need to send an emergency status and receive additional related instructions. One challenge thus is how to guarantee that CODs and CCF have the needed network resources.

Another issue may be that there may be numerous CODs in a workplace and some of the CODs may be moving. The CODs may need to have a reliable connection point at each time though. Given that the network resources may be shared among various CODs, another challenge is how to ensure availability of an adequate connection point in the vicinity of a COD.

In some example embodiments, an interface is therefore provided to convey both, connectivity needs and information on work plan, with associated motion planning. Variation of capabilities of CPs in time due to motion of CODs may be taken into account as well.

Connectivity and network availability may be seen as essential enablers to application performance and devices' safety. Therefore, correct dimensioning of the network and assignation of devices to suitable connection points are crucial. To achieve this, the network provider must be aware of both the applications' connectivity requirements and the real-time operational and planning data, in particular the tasks of the applications planned in space and time, for correct dimensioning of the network and to assign the suitable connectivity to moving devices. It might not be realistic to assume that COD controllers, such as orchestrator apparatus 122 and edge apparatus 130, would have knowledge of network topology if one wants optimal coordinated connection mapping.

Embodiments of the present disclosure therefore provide reliable COD connectivity, by addressing the abovementioned drawbacks. For example, guaranteed connectivity may be provided for robot-cloud communication. An initial slicing function may be completed using control apparatus 110, such as an IBAS-MACO module, that assigns CODs to CPs, possibly based on a global view of all CODs and connection points. Control apparatus 110 may use a COD work plan received from client apparatus 120 to anticipate the COD position and resource demand on CPs. Control apparatus 110 may store and analyze COD assignment and resulting network resources consumption to possibly derive demand and assignation patterns.

In some example embodiments, control apparatus 110 may compute a time-based connection plan and schedule. For each time period t, control apparatus 110 may indicate to a COD the identity of the connection point the COD has to connect to. The time-based connection plan may be global for all CODs and connection points and its computation may be based on the following received information:

- a work plan specifying the sequence of waypoints that the CODs must traverse;
- a map with the global topology of network CP covering the workplace and their capabilities;
- the Quality of Experience, QoE, needs of the CODs based on the type of traffic they emit (images, Light Detection and Ranging, LIDAR, odometer, Inertial Measurement Unit, IMU . . . )

Figure 2:
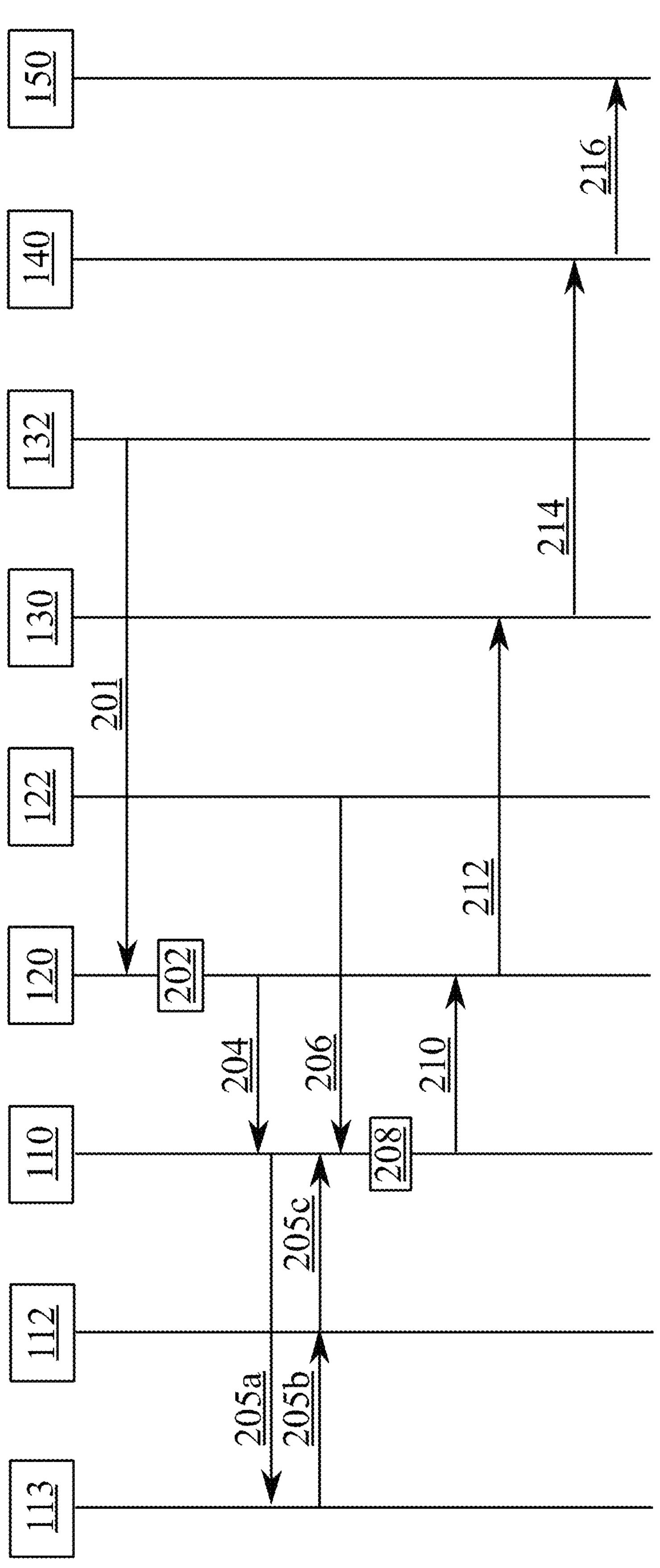
FIG. 2 illustrates a signalling graph in accordance with at least some example embodiments.

FIG. 2 illustrates a signalling graph in accordance with at least some example embodiments. On the vertical axes are disposed, from the left to the right, MLEARNED apparatus 113, CP capability calendar apparatus 112, control apparatus 110, client apparatus 120, Orchestrator apparatus 122, edge apparatus 130, ECOCO apparatus 132, CP 140 and COD 150 of FIG. 1. Time advances from the top towards the bottom.

During an initialization phase, approached default CP network resource allocation may be computed, based on the number of CODs and connectivity needs of the CODs. One example of allocated network resources may be a given bandwidth allocated to the CPs involved in the covered network topology. This allocation may be computed with methods used for network slicing.

At step 201, client apparatus 120 may receive flow characteristics of COD 150 from ECOCO 132. At step 202, client apparatus 120 may determine the flow characteristics of COD 150 and compute the needed QoE of the flows exchanged by COD 150.

At step 204, client apparatus 120 may transmit to 110 a request for resource allocation of COD 150 for a time range, wherein the time range may be in the future, after the request. In some embodiments, in the MACO client request and MACO server responses the "time range" may be a time period TP=D+H. TP may start at a given point in time D and last for a duration H that may be restricted to 0 (zero) seconds when strictly instant information is required. D may be encoded as an HTTP "Date" header field using the IMF-fixdate format specified in Section 7.1.1.1 of [RFC7231]. Note that the IMF-fixdate format uses "GMT", not "UTC", to designate the time zone, as in this example: Date: Tue, 15 Nov. 2019 08:12:31 GMT. This may be the format used in one embodiment where the CP capability calendar is supported by IETF RFC 8896 and an extension to be proposed on IETF RFC 9240.

The request may be a request for a list of at least one CP that COD 150 may connect to at said time range. The request may be for resource allocation of COD 150, at given positions on the workspace and on a given time range in the future, for example based on of the COD 150 work plan defined by orchestrator apparatus 122 for COD 150. In some example embodiments, client apparatus 120 may also transmit the requested QoE of the flow for COD 150 for said time range. In some embodiments, after the input work plan received from 122 (via 120), IBAS-MACO may compute the assignation of the most appropriate CP for each of the CODs for the next time periods indexed by t, t+1, etc.

At step 205*a*, control apparatus may transmit a COD work plan to MLEARNED apparatus 113. MLEARNED apparatus 113 may then estimate a velocity of at least one COD 150 and duration T between two successive CP connection plans. At step 205*b*, MLEARNED apparatus 113 may transmit a time-based estimation of position of each COD within the time range, such as between t+1 and t+n. At step 205*b*, CP capability calendar apparatus 112 may transmit a time-based CP capability to control apparatus 110.

At step 206, orchestrator apparatus 122 may transmit a work plan for a group of CODs, wherein the work plan comprises planned positions (waypoints) of the group of CODs to traverse, and the group of CODs comprises COD 150. The work plan may specify action plan for all involved CODs for said time range. The work plan specifies for each COD the next waypoint to reach and the next action to perform at this waypoint by the COD. The work plan may optionally specify the current motion attributes of CODs, such as linear and angular velocities. There may be more than one COD 150 in a given workspace.

At step 208, control apparatus 110 may compute, based at least on the work plan, a resource allocation for each of multiple CPs for said time range, wherein the resource allocation comprises an assignation of COD 150 to CPs. For example, control apparatus 110 may compute resource allocation with assignation of CODs to CPs, depending on the planned position of CODs. In some example embodiments, control apparatus 110 may compute the resource allocation by taking into account the requested QoE of the flow. In some embodiments, the requested QoE may be translated to QoS parameters and amounts of network resources. The amounts of network resources for each COD may be compared to CP capabilities in order to decide whether a given CP can accommodate a given COD.

In some example embodiments, control apparatus 110 may compute CP capability calendar, preferably based on IETF RFC 8896 and extensions of IETF RFC 9240. IETF RFC 8896 specifies a protocol to expose time-based values of abstracted path costs referred to as cost calendars. One example of cost calendar may be path bandwidth every 10 seconds for the next 5 minutes. IETF RFC 9240 specifies a protocol to expose properties on abstracted network entities, one example may be memory capacity or bandwidth capacity of a CP. In some embodiments, RFC 9240 may be extended to provide CP capability calendars that would convey time-based properties of entities such as CP. CP capabilities may be seen as a subset of CP properties. Control apparatus 110 may further compute, based at least on the CP capability calendar, the resource allocation.

In some example embodiments, control apparatus 110 may use previous CP capability calendar. Control apparatus 110 may determine a previous connection point capability calendar, wherein the previous CP capability calendar was used before receiving the request, and compute the resource allocation based at least on the previous CP capability calendar. To this end, control apparatus 110 may use the actual position and if available, the velocity of all the CODs received from orchestrator apparatus 122 (via client apparatus 120), and compare it with the expected COD position computed in the previous time range. This allows determining the next expected position of CODs upon the work plan received from orchestrator apparatus 122 (via client apparatus 120).

In some example embodiments, control apparatus 110 may use CODs work plans available from orchestrator apparatus 122. A MLEARNED apparatus 113, such as a learning module, may estimate the duration of the tasks of the work plan by measuring the time during which COD 150 may notify orchestrator apparatus 122, via 132 (ECOCO), that it is executing the task. If the velocity information of CODs is not provided with the work plan, MLEARNED apparatus 113 may compute its estimation with respect to the measured time between the location of the previous waypoint and the next waypoint, for CODs of the same type that need to perform the same task. This estimation may further optionally be adjusted with respect to the time range corresponding to period t+1, in case there would be time-based patterns for COD velocity.

In some example embodiments, control apparatus 110 may associate COD and CP for next at least 1 time period t+1. Control apparatus 110 may determine the duration of time range T between two successive computation time periods t and t+1 as the smallest average time range observed on CODs beyond which a COD connects to a new CP. Control apparatus 110 may determine the number of periods of the COD connection plan, that must be equal to at least 1. Time range T may be computed by a MLEARNED apparatus 113 that analyses the time after which each CODs connects to another CP once it has left a given waypoint. Time range T may optionally be adjusted with respect to the minimum interval used by orchestrator apparatus 122 between sending two consecutive work plan updates.

In some example embodiments, control apparatus 110 may update estimated CP capability calendar for at least the next period t+1. The capabilities of a CP for t+1 may be updated with respect to the estimated set of CODs expected to connect at t+1 and their QoE needs. Control apparatus 110 may use at least one of the work plan, the machine learned task durations, the machine learned trip duration between pairs of consecutive waypoints in work plan, the machine learned time to re-connect T or the CP to waypoint coverage association, to estimate the set of CODs covered by each CPs at time range t+1. Control apparatus 110 may then compute the best set of CODs to associate to each CP.

In some example embodiments, control apparatus 110 may store said time range, the resource allocation, CP resources budget, (COD, CP) association and CP resources consumption. In some embodiments, the information may be stored for assignation for upcoming time ranges from t+1 to t+n.

At step 210, control apparatus 110 may transmit the resource allocation to client apparatus 120. Client apparatus 120 may further transmit, at step 212, the resource allocation to edge apparatus 130. At step 214, edge apparatus 130 may transmit the resource allocation to CP 140 and, at step 216, CP 140 may transmit the resource allocation to COD 150.

COD 150 may then communicate wireless with CP 140 according to the resource allocation.

In some example embodiments, control apparatus 110 may monitor resource consumption of the CPs to detect a shortage of resources and adjust the resource allocation for at least one of the CPs when the shortage of resources is detected at a frequency larger than a threshold. That is, if resources shortage is repeated at a frequency greater than threshold % of the execution period, control apparatus 110 may adjust CP resources in the network slice computed at the initialization phase. When the shortage is detected at a frequency lower than threshold % of the execution period but is detected periodically, control apparatus 110 may adjust COD to CP allocation.

In some example embodiments, message exchange between CODs and controllers with MQTT protocol may be based on the VDA 5050 standard. The MQTT broker may be located in the edge cloud. Concerning the VDA 5050 standard a connection plan may be specified for all CODs and CPs, wherein the connection plan may define which CODs are to connect to which CPs. Alternatively, or in addition, a connection action may be specified. The connection action may be sent to a given COD and specify its assigned CPs, actions to perform such as "connect" or disconnect" and connection parameters such as time, type and identity of a flow.

In some example embodiments, a VDA 5050 topic "factsheet" may be extended in order to convey information on the flows (type, size, etc.) emitted by the CODs. Such information on the flows may be needed by client apparatus 120 to derive information on QoE and network resources needs for CODs. Such information may comprise at least one of the type of emitted flows (e.g., odometer, image, LIDAR, etc.), or flow parameters (e.g., image resolution, emission frequency, message size.

In some example embodiments, orchestrator apparatus 122 may host client apparatus 120 that queries a COD connection plan that is applicable to all CODs and all CPs in the workplace. Orchestrator apparatus 122 may communicate via MQTT with edge apparatus 130, like a COD controller function named EMACO that is associated to the COD controllers in the edge cloud. Client apparatus 120 may publish the COD connection plan.

In some example embodiments, a topic named for instance "connectionPlan" may carry information on at least: time range, the set of CPs, the set of CODs, the CP to which a COD must connect, the flows emitted by CODs, the QoS of each flow. (time t, CPid, CODid, COD-CP-FlowIDs, FlowIDQoS). Edge apparatus 130 may subscribe to the "connectionPlan" topic at the latest every 30 secs (like VDA 5050). Edge apparatus 130 may compare the received COD connection plan with the previously received one and then dispatch orders to controllers of the CODs that are impacted by changes in the COD connection plan. Client apparatus 110 may subscribe to the existing MQTT/VDA 5050 topic "order" to get a motion graph. However, client apparatus 110 may need to subscribe in the name of all CODs, such as Automated Guided Vehicles, AGVs.

In some example embodiments, while a COD may have a choice among several possible CPs, a CP may have the choice to accommodate several possible CODs. The COD assignation algorithm may have at least one of the following characteristics:

- CP-centric (as opposed to COD-centric): While a COD may have a choice among several possible CPs, a CP may have a choice among several possible CODs. Therefore, the main decision loop is on the CPs and not on the CODs. The CP-centric approach may be optimized with constraints on the distance of reach of the CODs in the vicinity of the CPs and/or priority on CODs transmitting/receiving priority flows;
- COD to CP assignation may be based on decision metrics reflecting one or more capabilities of the CPs and QoE constraints of the CODs;
- The COD to CP assignation algorithm may include a step where the CP capabilities and cost of connecting to the CPs is estimated in future times based on the COD work plan and COD task achievement state. The CP capabilities and connection costs may be represented in a standard format that needs to extend existing RFC 8896 and RFC 9240.

In some example embodiments, the connection plans computed by control apparatus 110 may be requested and received by client apparatus 120 that may have at least one of the following functionalities:

- client apparatus 120 may translate COD flow properties received via the MQTT broker to QoE or Quality of Service, QoS, attributes;
- client apparatus 120 may compute time t at which a next connection plan is needed;
- client apparatus 120 may compute the time period T at which edge apparatus 130 should get a plan from the MQTT broker. This may require introduction of a MACO specific topic "connection plan request time";
- client apparatus 120 may gather all other information needed to specify attributes of the connection plan requests sent by client apparatus 120, in particular the COD work plan, COD flow properties.

In some example embodiments, VDA 5050 may be extended by introducing a connection plan and/or a connection action. Alternatively, or in addition, sub-topic "factsheet/flowSpecification" may be extended. Topic "factsheet/flowSpecification" may extend VDA 5050 to specify information on COD emitted flows from which client apparatus 120 derives QoE and network resources requirements:

- the type of emitted flows (e.g. odometer, image, LIDAR, etc),
- flow parameters such as image resolution, emission frequency, message size.

Control apparatus may need to subscribe to the MQTT/VDA 5050 "order" topic to get a COD work plan in the name of more than one CODs. Another extension to VDA 5050 may be useful to allow grouping orders for several CODs in one message.

In some example embodiments, IETF RFC 9240 may be extended by

- introducing property calendars that, for a given sequence of time intervals, specifies CP properties reflecting their capabilities;
- introducing properties characterizing CP connectivity and performances thereof and associating these properties to the entity domain type in which a CP is represented. For instance, whether a CP is specified as an abstracted network location (named Provider-defined Identifier, PID, as per RFC 7285) or an abstract network element (named Abstracted Network Element, ANE, as per RFC 8895), or a cell, specific properties need to be defined and applicable to these entity types.

Figure 3:
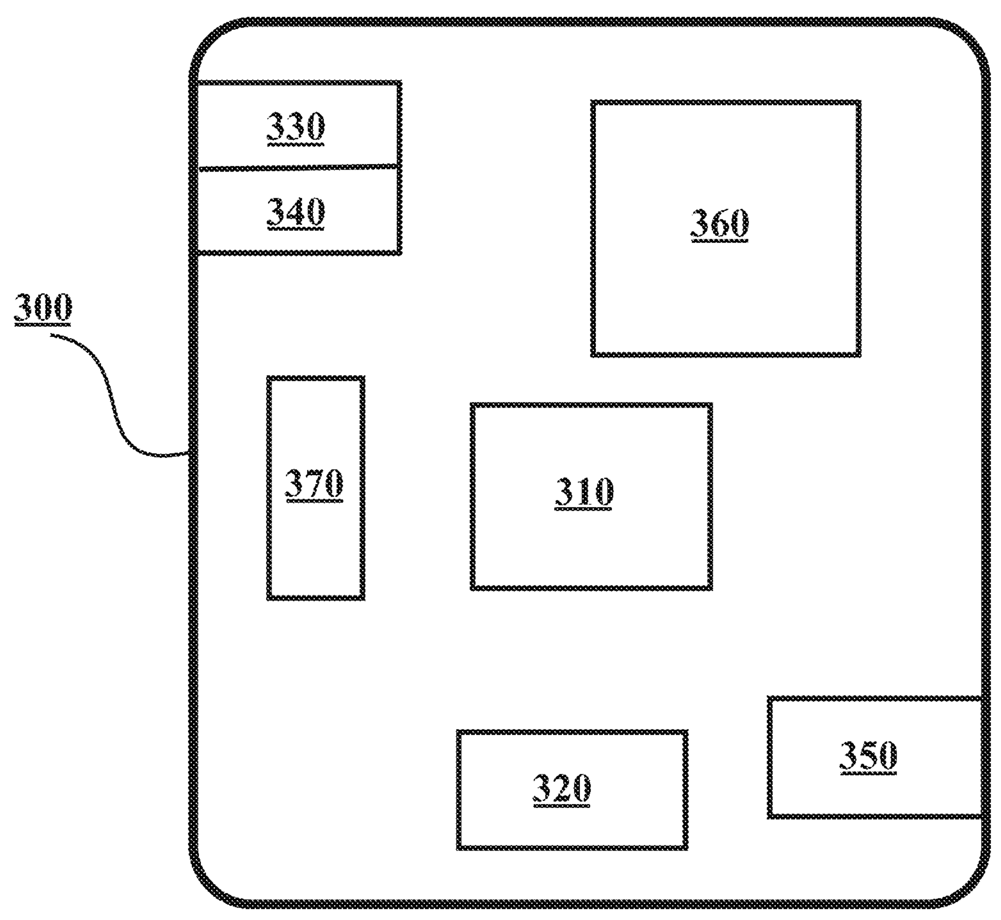
FIG. 3 illustrates an example apparatus capable of supporting at least some example embodiments.

FIG. 3 illustrates an example apparatus capable of supporting at least some example embodiments. Illustrated is device 300, which may comprise, for example, control apparatus 110, or any other apparatus in FIG. 1 and FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile communication, GSM, Wideband Code Division Multiple Access, WCDMA, Long Term Evolution, LTE, and/or 5G/NR standards, for example.

Device 300 may comprise a Near-Field Communication, NFC, transceiver 350. NFC transceiver 350 may support at least one NFC technology, such as Bluetooth, Wibree or similar technologies.

Device 300 may comprise User Interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 5. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some example embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the example embodiment, various ways of interconnecting at least two of the aforementioned devices may be selected without departing from the scope of the example embodiments.

Figure 4:
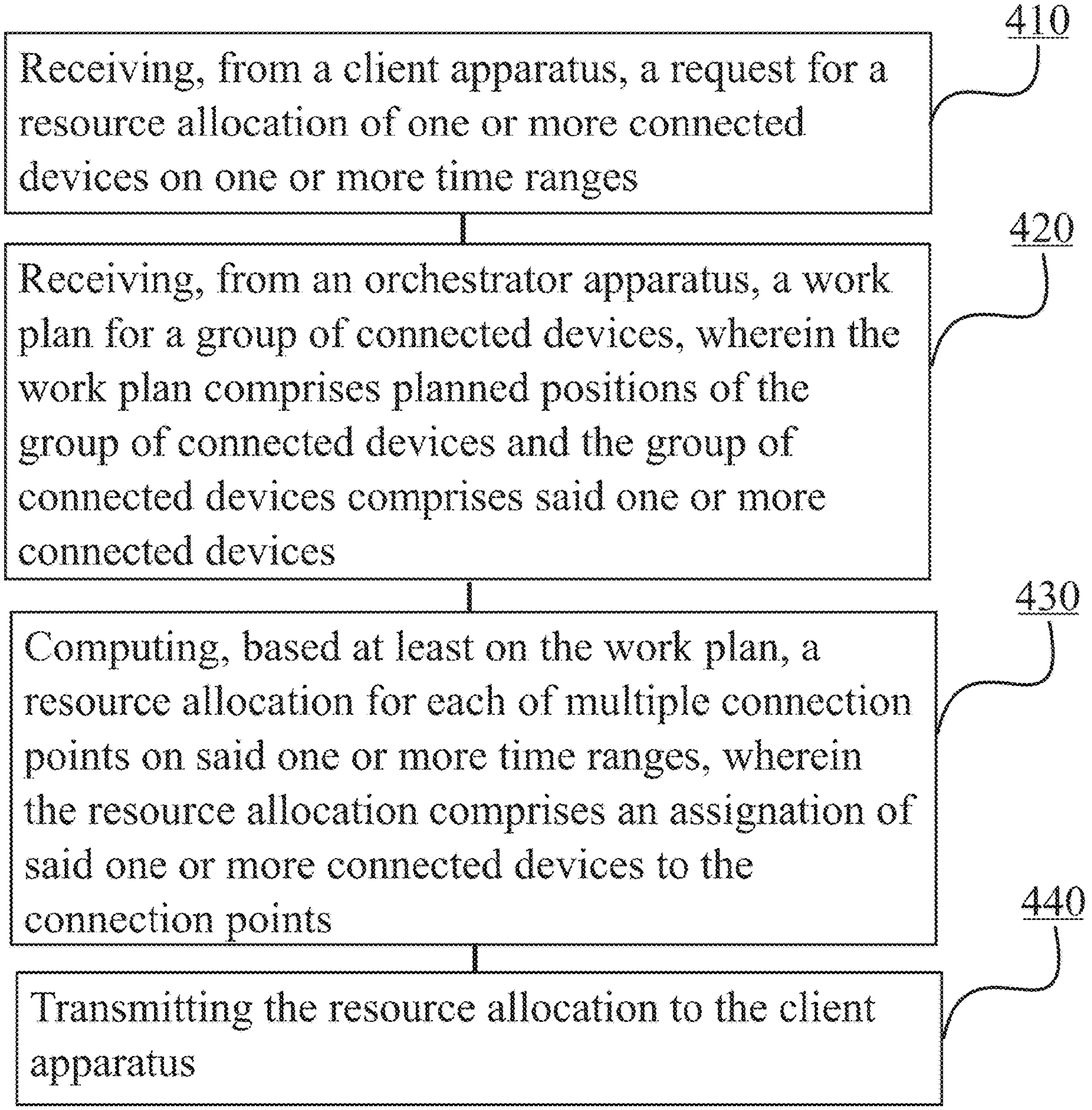
FIG. 4 illustrates a flow graph of a method in accordance with at least some example embodiments.

FIG. 4 is a flow graph of a method in accordance with at least some embodiments. The method may be performed by control apparatus 110 of FIG. 1.

The method may comprise, at step 410, receiving, from a client apparatus, a request for a resource allocation of one or more connected devices on a time range. The method may also comprise, at step 420, receiving, from an orchestrator apparatus, a work plan for a group of connected devices, wherein the work plan comprises planned positions of the group of connected devices and the group of connected devices comprises said one or more connected devices. The method may further comprise, at step 430, computing, based at least on the work plan, a resource allocation for each of multiple connection points on said time range, wherein the resource allocation comprises an assignation of said one or more connected devices to the connection points. Finally, the method may comprise, at step 440, transmitting the resource allocation to the client apparatus.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an example embodiment, control apparatus 110 may comprise means for carrying out the embodiments described above and any combination thereof.

In an example embodiment, a computer program comprising instructions which, when the program is executed by an apparatus, may cause the apparatus to carry out the first method or the second method. in accordance with the embodiments described above and any combination thereof. In an example embodiment, a computer program product, embodied on a non-transitory computer readable medium, may be configured to control a processor to perform a process comprising the embodiments described above and any combination thereof.

In an example embodiment, control apparatus 110 may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the disclosure. One skilled in the relevant art will recognize, however, that the disclosure can be practiced without one or more of the specific details, or with other methods, components, materials, etc. In other instances, well-known structures, materials, or operations are not shown or described in detail to avoid obscuring aspects of the disclosure.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application in communication networks.

ACRONYMS LIST

3GPP 3$^{rd}$ Generation Partnership Project
AGV Automated Guided Vehicles
ANE Abstracted Network Element
BS Base Station
CCF COD Control Function
COD COnnected Device
CP Connection Point
EMACO Edge MACO
IBAS Intent-Based Application Slicing
IETF Internet Engineering Task Force
IMU Inertial measurement unit
IoT Internet of Things
LIDAR Light Detection and Ranging
LTE Long Term Evolution
M2M Machine-to-Machine
MACO Motion Aware Coordinated connection
MQTT Message Queue Telemetry Transport
MTC Machine-Type Communications
NR New Radio
PID Provider-defined Identifier
QoE Quality of Experience QOS Quality of Service
RAT Radio Access Technology
RFC Request For Comments
TRP Transmission and Reception Point
UE User Equipment
WiMAX Worldwide Interoperability for Microwave Access
WLAN Wireless Local Area Network

REFERENCE SIGNS LIST

| | |
|---|---|
| 110 | Control apparatus |
| 112 | CP capability calendar apparatus |
| 113 | MLEARNED apparatus |
| 115, 125, 135, 145 | Interfaces |
| 120 | Client apparatus |
| 122 | Orchestrator apparatus |
| 130 | Edge apparatus |
| 132 | ECOCO apparatus |
| 140 | Connection point |
| 150 | Connected device |
| 300-370 | Structure of the apparatus of FIG. 3 |
| 410-440 | Phases of the method in FIG. 4 |

The invention claimed is:

1. A control apparatus comprising:
at least one processor; and
at least one memory storing instructions that, when executed by the at least one processor, cause the apparatus at least to:
receive, from a client apparatus, a request for a resource allocation of one or more connected devices on one or more time ranges;
receive, from an orchestrator apparatus, a work plan for a group of connected devices, wherein the work plan comprises planned positions of the group of connected devices and the group of connected devices comprises said one or more connected devices;
compute, based at least on the work plan, a resource allocation for each of multiple connection points on said one or more time ranges, wherein the resource allocation comprises an assignation of said one or more connected devices to the connection points; and
transmit the resource allocation to the client apparatus.

2. The apparatus according to claim 1, wherein the stored instructions further cause, when executed by the at least one processor, the apparatus at least to:
receive, from the client apparatus, a requested quality of experience of a flow for said one or more connected devices for said time range; and
compute, based at least on the requested quality of experience of the flow, the resource allocation.

3. The apparatus according to claim 1, wherein the stored instructions further cause, when executed by the at least one processor, the apparatus at least to:
compute a connection point capability calendar on said time range; and
compute, based at least on the connection point capability calendar, the resource allocation.

4. The apparatus according to claim 1, wherein the stored instructions further cause, when executed by the at least one processor, the apparatus at least to:
determine a previous connection point capability calendar, wherein the previous connection point capability calendar was used before receiving the request; and
compute, based at least on the previous connection point capability calendar, the resource allocation.

5. The apparatus according to claim 1, wherein the stored instructions further cause, when executed by the at least one processor, the apparatus at least to:
monitor resource consumption of the connection points to detect a shortage of resources; and
adjust the resource allocation for at least one of said multiple connection points when the shortage of resources is detected at a frequency larger than a threshold; and
adjust the connection point capability calendar for at least one of said multiple connection points when the shortage of resources is detected at a frequency lower than a threshold on said connection points.

6. The apparatus according to claim 1, wherein the resource allocation comprises at least one network slice.

7. A method, comprising:
receiving by a control apparatus, from a client apparatus, a request for a resource allocation of one or more connected devices on one or more time ranges;
receiving by the control apparatus, from an orchestrator apparatus, a work plan for a group of connected devices, wherein the work plan comprises planned positions of the group of connected devices and the group of connected devices comprises said one or more connected devices;
computing by the control apparatus, based at least on the work plan, a resource allocation for each of multiple connection points on said one or more time ranges, wherein the resource allocation comprises an assignation of said one or more connected devices to the connection points; and
transmitting, by the control apparatus, the resource allocation to the client apparatus.

8. The method according to claim 7, further comprising:
receiving by the control apparatus, from the client apparatus, a requested quality of experience attributes of a flow for said one or more connected devices for said time range; and
computing by the control apparatus, based at least on the requested quality of experience attributes of the flow, the resource allocation.

9. The method according to claim 7, further comprising:
computing, by the control apparatus, a connection point capability calendar on said time range; and
computing by the control apparatus, based at least on the connection point capability calendar, the resource allocation.

10. The method according to claim 7, further comprising:
determining, by the control apparatus, a previous connection point capability calendar, wherein the previous connection point capability calendar was used before receiving the request; and
computing by the control apparatus, based at least on the previous connection point capability calendar, the resource allocation.

11. The method according to claim 7, further comprising:
monitoring, by the control apparatus, resource consumption of the connection points to detect a shortage of resources; and
adjusting, by the control apparatus, the resource allocation for at least one of said multiple connection points when the shortage of resources is detected at a frequency larger than a threshold; and
adjusting the connection point capability calendar for at least one of said multiple connection points when the shortage of resources is detected at a frequency lower than a threshold on said connection points.

12. The method according to claim 7, wherein the resource allocation comprises at least one network slice.

13. A non-transitory computer readable medium having stored thereon a set of computer readable instructions that, when executed by at least one processor, cause an apparatus to at least perform:

receiving, from a client apparatus, a request for a resource allocation of one or more connected devices on one or more time ranges;

receiving, from an orchestrator apparatus, a work plan for a group of connected devices, wherein the work plan comprises planned positions of the group of connected devices and the group of connected devices comprises said one or more connected devices;

computing, based at least on the work plan, a resource allocation for each of multiple connection points on said one or more time ranges, wherein the resource allocation comprises an assignation of said one or more connected devices to the connection points; and transmitting the resource allocation to the client apparatus.

14. The non-transitory computer readable medium according to claim 13, wherein the stored set of computer readable instructions, when executed by the at least one processor, further cause the apparatus to at least perform:

receiving, from the client apparatus, a requested quality of experience of a flow for said one or more connected devices for said time range; and computing, based at least on the requested quality of experience of the flow, the resource allocation.

15. The non-transitory computer readable medium according to claim 13, wherein the stored set of computer readable instructions, when executed by the at least one processor, further cause the apparatus to at least perform:

computing a connection point capability calendar on said time range; and computing, based at least on the connection point capability calendar, the resource allocation.

16. The non-transitory computer readable medium according to claim 13, wherein the stored set of computer readable instructions, when executed by the at least one processor, further cause the apparatus to at least perform:

determining a previous connection point capability calendar, wherein the previous connection point capability calendar was used before receiving the request; and computing, based at least on the previous connection point capability calendar, the resource allocation.

17. The non-transitory computer readable medium according to claim 13, wherein the stored set of computer readable instructions, when executed by the at least one processor, further cause the apparatus to at least perform:

monitoring resource consumption of the connection points to detect a shortage of resources; and adjusting the resource allocation for at least one of said multiple connection points when the shortage of resources is detected at a frequency larger than a threshold; and adjusting the connection point capability calendar for at least one of said multiple connection points when the shortage of resources is detected at a frequency lower than a threshold on said connection points.

18. The non-transitory computer readable medium according to claim 13, wherein the resource allocation comprises at least one network slice.

* * * * *